3,364,195
HYDROXYINDANE AZO BENZANILIDE DYES
William G. Huey, Nassau, William H. Armento, Albany, and Lester N. Stanley, Delmar, N.Y., assignors to General Aniline & Film Corporation, New York, N.Y., a corporation of Delaware
No Drawing. Filed Oct. 13, 1964, Ser. No. 403,652
7 Claims. (Cl. 260—192)

ABSTRACT OF THE DISCLOSURE

Hydroxyindane azo benzanilide dyes is obtained by first diazotizing an aminobenzanilide of the formula

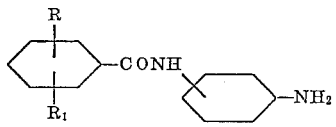

wherein R represents either hydrogen, hydroxy, halogen such as bromine or chlorine, lower alkyl and lower alkoxy, and $R_1$ represents the same values as R except hydroxy, and then coupling the resulting diazotized compound with either 4- or 5-hydroxyindane. The hydroxyindane azo benzanilides produce on polyester fibers dyeings of bright yellow shade of good build-up, with fastness to light, wash, dry-cleaning and sublimation fastness.

---

This invention relates to a new class of azo dyes for synthetic fibers and more particularly to hydroxyindane azo benzanilide dyes and to fibers dyed therewith.

The increased use of polyester fibers in recent years has led to a demand for an improved process of dyeing these fibers. The use of conventional dyes, i.e., those previously found suitable for other synthetic materials, have not been found as suitable for polyesters. These dyes suffer from lack of wash fastness and dry cleaning fastness, and are not sufficiently resistant to fading and sublimation. Recently many new dyes have appeared on the market tailored particularly for polyester fibers. However, many of these dyes are poor in light fastness. Dyes of improved light fastness are usually subject to the drawback of insufficient resistance to sublimation at high temperatures. The problem is of importance since it prevents the use of high temperature dyeing processes (such as the widely used Thermosol process) which are of value in producing especially fast bright dyes in an economical and practical manner. These difficulties continue to be a particular problem in the polyester field due to the increasing popularity of the continuous Thermosol process for Dacron and cotton-Dacron blends.

Moreover, the less bathochromic yellow dyes tend to sublime more on high temperature treatment than other dyes. Thus, it becomes increasingly important to find yellow dyes which will dye polyester fiber in bright yellow shades of good light and sublimation fastness.

It is an object of this invention to produce a novel class of yellow hydroxyindane azo benzanilide dyes.

It is another object of this invention to produce synthetic fibers dyed therewith.

It is a further object of this invention to produce dyeings especially on polyester fiber of a bright yellow shade of good build-up with fastness to light, wash, dry cleaning and sublimation fastness.

Other objects and advantages will become evident from the following description.

We have discovered that the foregoing objects are readily attained by diazotizing an aminobenzanilide and coupling the resulting diazotized compound with either 4- or 5-hydroxyindane. The resulting dyes are bright yellow dyes which are especially useful as disperse dyes for dyeing synthetic fibers such as cellulose acetate, cellulose triacetate, poly-amides, polyvinyl, polyacrylic and polyurethane fibers and the like, especially polyester (polyethylene terephthalate) fiber, and are characterized by the following formula:

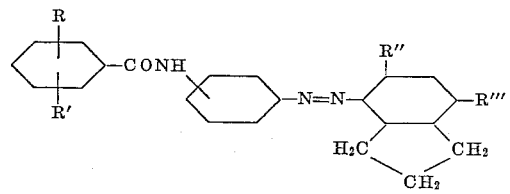

wherein R represents either hydrogen, hydroxy, halogen, such as bromine, chlorine, etc., lower alkyl, e.g., methyl, ethyl, propyl; lower alkoxy such as methoxy, ethoxy and propoxy, R' represents either hydrogen, halogen, lower alkyl or lower alkoxy of the same value as R, and R" and R'" represent either hydrogen or hydroxy, but only one of R" and R'" being hydrogen.

In preparing the new class of azo dyes, one mole of an aminobenzanilide of the formula:

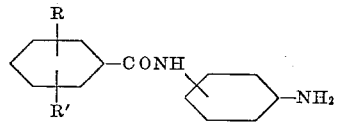

wherein R and R' have the same values as above, is mixed well with hydrochloric acid, iced to 0–30° C., and then diazotized by addition of sodium nitrite in the conventional manner. Approximately one mole of 4- or 5-hydroxyindane is dissolved in water which has been made alkaline with sodium hydroxide. If desired, a somewhat smaller amount or an excess of hydroxyindane (up to 10%) may be used. The diazo solution is run into the coupler solution while maintaining the temperature below 20° C. and at a pH of 8.5–9. The azo dye is then filtered and washed. It is advantageous to disperse the dye prior to drying by mixing it well with any commercially available anionic dispersing agent, such as Polyfon H (sodium ligninsulfonate), Leonil SA (anionic naphthalenesulfonate) and the like. The nature or character of the anionic is immaterial so long as it is capable of dispersing dyes. The amount of anionic dispersing agent may range from about one-quarter part by weight to one and one-half parts by weight for each part by weight of dye.

As examples of aminobenzanilides (diazo bases), the following are illustrative:

2'-aminobenzanilide
2'-amino-4-propoxybenzanilide
3'-aminobenzanilide
4'-aminobenzanilide
4'-amino-2-chlorobenzanilide
4'-amino-3-chlorobenzanilide
4'-amino-4-chlorbenzanilide
4'-amino-2,4-dichlorobenzanilide
4'-amino-2,5-dichlorobenzanilide
4'-amino-3,4-dichlorobenzanilide
4'-amino-2-bromobenzanilide
4'-amino-4-bromobenzanilide
4'-amino-o-toluanilide
4'-amino-m-toluanilide
4'-amino-p-toluanilide
4'-amino-2,4-dimethylbenzanilide
4'-amino-2,5-dimethylbenzanilide
4'-amino-3,4-dimethylbenzanilide
4'-amino-4-chloro-o-toluanilide
4'-amino-o-anisoylanilide
4'-amino-m-anisoylanilide
4'-amino-p-anisoylanilide
4'-amino-2-propoxybenzanilide 4'-amino-2,4-dimethoxybenzanilide
4'-amino-2,5-dimethoxybenzanilide
4'-amino-2,4-diethoxybenzanilide
4'-amino-5-chloro-o-anisoylanilide
4'-amino-6-chloro-m-anisoylanilide
4'-amino-3-bromo-p-anisoylanilide
4'-amino-4-methoxy-o-toluanilide
4'-amino-4-ethoxy-o-toluanilide
4'-aminosalicylanilide
4'-amino-3-hydroxybenzanilide
4'-amino-4-hydroxybenzanilide
4'-amino-4-hydroxy-m-toluanilide
4'-amino-3-methylsalicylanilide
4'-amino-5-chlorosalicylanilide
4'-amino-4-hydroxy-m-anisoylanilide The following examples illustrate the invention but are not to be considered limitative thereto.

*Example 1*

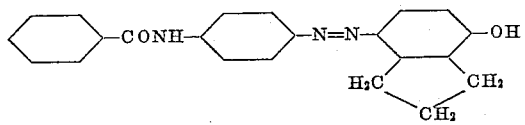

21.2 grams of 4'-aminobenzanilide were mixed with 500 cc. of water and 25 cc. of hydrochloric acid 20° Bé., heated to 95° C., and then cooled. At about 25–30° C. 10 cc. of a 31.5% solution of sodium nitrite were added. Before coupling, excess nitrite was removed by treatment with sulfamic acid.

14.75 grams of 4-hydroxyindane were dissolved in 400 cc. of water containing 4 grams of sodium hydroxide plus 5 grams of soda ash. The diazo solution was run into this solution while maintaining a pH of 8.5–9 by addition of soda ash as needed and care being taken that the temperature remained below 20° C. After coupling had taken place, the dye paste was filtered and washed several times with water.

22 grams of the 100% azo dyestuff in the form of a wet paste, 20 grams of Polyfon H (sodium ligninsulfonate) and 4 cc. of Nekal WS-35 (sodium alkylnaphthalenesulfonate), were wet down in a mixer with water to give a thick doughy mass. The water was evaporated off to viscous milling viscosity, and viscous milled for 1½ hours, water being added as needed. The product was then dried to a powder.

2 ounces of the dispersed dyestuff were dispersed in 83 cc. of warm water and poured into a solution containing 0.2 gram of Keltex gum (an alginic thickening agent) and 1 cc. of Nekal NF (sodium alkyl naphthalenesulfonate). The solution was made up to a gallon with water. Dacron polyester material was padded with this solution at 160° F., dried and cured at 425° F. for 90 seconds. The material was soaped at the boil for 5 minutes, washed and dried. A bright yellow shade was obtained of good light fastness and excellent sublimation properties.

*Example 2*

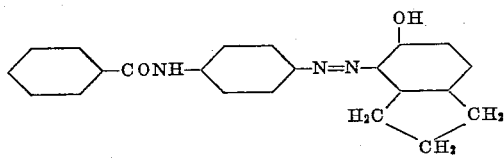

Example 1 was repeated with the exception that the 4-hydroxyindane was replaced by 14.75 grams of 5-hydroxyindane. The resulting dyeing was somewhat redder in shade than when the 4-hydroxyindane was employed, has better light fastness, and good sublimation properties.

*Example 3*

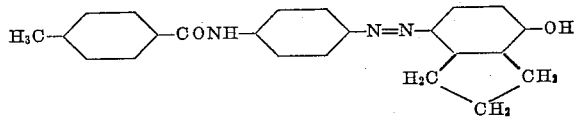

Example 1 was repeated with the exception that the 4'-aminobenzanilide was replaced by 22.6 grams of 4'-amino-p-toluanilide. The resultant dyeing was somewhat redder in shade, and had good light fastness and good sublimation properties.

*Example 4*

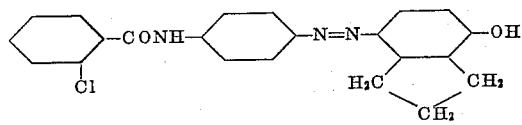

In the manner of Example 1, 24.7 grams of 2-chloro-4'-aminobenzanilide were diazotized and coupled to 4-hydroxyindane to give a yellow dye having a somewhat greener shade, but having good light fastness and sublimation properties.

*Example 5*

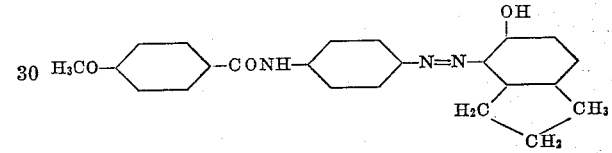

In the manner of Example 1, 24.2 grams of 4'-amino-p-anisanilide were diazotized and coupled to 5-hydroxyindane to give a more reddish colored dye which has good light fastness and sublimation properties.

*Example 6*

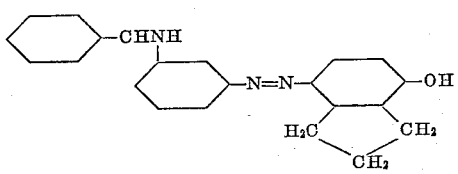

In the manner of Example 1, 21.2 grams of 3'-aminobenzanilide were diazotized and coupled with 4-hydroxyindane. The yellowish dye thus produced has good light fastness and sublimation properties.

Dyeings on polyester with the foregoing dyes range from about 0.2% to 10% on the weight of the fiber, but generally are from about 0.5% to 5% on the weight of the fiber.

By the term "polyester fiber" as employed in the appended claims, we include filament yarns, staple fibers and cloth fabricated from such fibers.

We claim:
1. Hydroxyindane azo benzanilide dyes having the following formula:

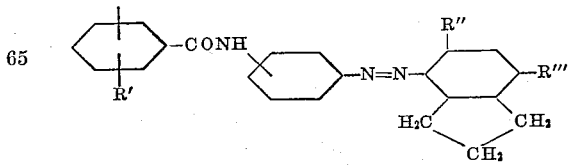

wherein R' represents a member selected from the group consisting of hydrogen, bromine, chlorine, lower alkyl and lower alkoxy, and each of R" and R'" are independently selected from the group consisting of hydrogen and hydroxy.

2. A hydroxyindane azo benzanilide dye having the following formula:

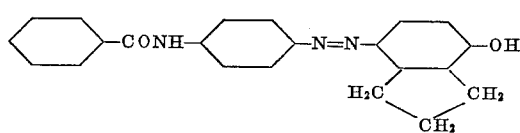

3. A hydroxyindane azo benzanilide dye having the following formula:

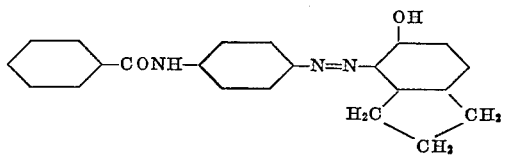

4. A hydroxyindane azo benzanilide dye having the following formula:

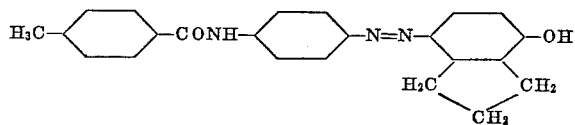

5. A hydroxyindane azo benzanilide dye having the following formula:

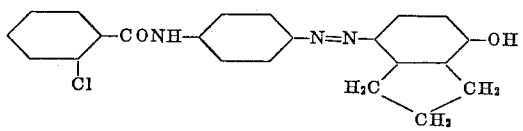

6. A hydroxyindane azo benzanilide dye having the following formula:

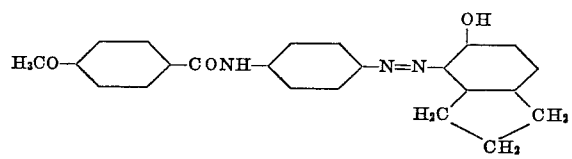

7. A hydroxyindane azo benzanilide dye having the following formula:

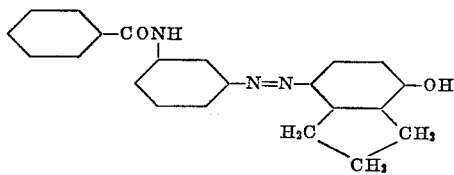

References Cited
UNITED STATES PATENTS
2,072,288   3/1937   Zerweck et al. _____ 260—192

FLOYD D. HIGEL, Primary Examiner.